United States Patent
Hayes et al.

(10) Patent No.: US 7,935,181 B2
(45) Date of Patent: May 3, 2011

(54) CORROSION RESISTANT COATINGS WITH MODIFIED METAL SALTS OF CORROSION RESISTING ORGANIC ANIONS

(75) Inventors: Scott Hayes, Zion, IL (US); Patrick J. Kinlen, Fenton, MO (US)

(73) Assignee: Lumimove, Inc., St. Louis, MO (US)

( * ) Notice: Subject to any disclaimer, the term of this patent is extended or adjusted under 35 U.S.C. 154(b) by 358 days.

(21) Appl. No.: 12/074,578

(22) Filed: Mar. 5, 2008

(65) Prior Publication Data

US 2008/0216705 A1 Sep. 11, 2008

Related U.S. Application Data

(60) Provisional application No. 60/904,925, filed on Mar. 5, 2007.

(51) Int. Cl.
*C04B 9/02* (2006.01)
*B05D 7/00* (2006.01)
*B32B 15/04* (2006.01)

(52) U.S. Cl. .................. 106/14.44; 427/419.1; 428/470

(58) Field of Classification Search ........................ None
See application file for complete search history.

(56) References Cited

U.S. PATENT DOCUMENTS

| | | | |
|---|---|---|---|
| 4,405,732 A | 9/1983 | Chao et al. | |
| 4,427,560 A | 1/1984 | Holstedt et al. | |
| 4,999,134 A | 3/1991 | Liedek | |
| 5,013,482 A | 5/1991 | O'Neil | 252/395 |
| 5,925,174 A | 7/1999 | Aoyama et al. | |
| 5,948,147 A | 9/1999 | Sinko | |
| 6,139,610 A | 10/2000 | Sinko | 106/14.44 |
| 7,166,664 B1 | 1/2007 | Anderson | |
| 2002/0197468 A1 | 12/2002 | Sinko | |
| 2004/0035498 A1 | 2/2004 | Kinlen | |
| 2004/0149963 A1 | 8/2004 | Sinko et al. | |
| 2004/0255819 A1 | 12/2004 | Sinko | |
| 2005/0022693 A1 | 2/2005 | Sinko et al. | |

FOREIGN PATENT DOCUMENTS

| | | |
|---|---|---|
| EP | 0 587 434 A1 | 3/1994 |
| WO | WO 03 102034 A1 | 12/2003 |

OTHER PUBLICATIONS

International Search Authority/U.S., Commissioner for Patents, PCT International Search Report/Written Opinion, completed May 25, 2009, mailed Jun. 8, 2009, PCT International Application No. PCT/US2008/02966, International Filing Date Mar. 5, 2008.
Validation of Novel Electroactive Polymers as Environmentally Compliant Coatings for Replacement of Hexavalent Chromium Pretreatments, ESTCP Environmental Security Technology Certification Program, Dr. Peter Zarras, Naval Air Systems Command, China Lake, CA, http://www.estcp.org/Technology/WP-0527-FS.cfm Copyright © 1999-2006 ESTCP. All rights reserved.
Abstract, ScienceDirect, Progress in using conductive polymers as corrosion-inhibiting coatings, P. Zarras, et al., Naval Air Warfare Center Weapons Division, China Lake CA, Radiation Physics and Chemistry, vol. 68, Issues 3-4, Oct.-Nov. 2003, pp. 387-394, Proceedings of the 7$^{th}$ International Conference on Pistron and Positronium Chemistry, http://www.sciencedirect.com/science?_ob=ArticleURL&_udi=B6TVT-48NX3N4-1&$_{13}$ co.
Electro-Active Polymers as Green Alternatives to Hexavalent Chrome, China Lake Searches for Suitable Coating Substitutes, Currents, Spring 2005, Nichole Anderson and Peter Zarrs @ Naval Air Warfare Center China Lake, CA.
Patent Cooperation Treaty, The International Bureau of WIPO, PCT Notification Concerning the Transmittal of International Preliminary Report on Patentability (Chapter I of the Patent Cooperation Treaty) mailed Feb. 11, 2010, International Application No. PCT/US2008/002966 filed Mar. 5, 2008, Applicant Crosslink et al.
European Patent Office, Extended/Supplementary European Search Report, completed Sep. 28, 2010, mailed Oct. 6, 2010, European Patent Application No. 08794316.3, Applicant Crosslink.

*Primary Examiner* — Emily M Le
*Assistant Examiner* — Sarah A Slifka
(74) *Attorney, Agent, or Firm* — Nelson Mullins Riley & Scarborough, LLP

(57) ABSTRACT

A corrosion-responsive agent comprising a neutralized metal salt of a corrosion inhibiting organic anion and methods of making and using it are described.

19 Claims, 4 Drawing Sheets

CORROSION RESISTANT COATINGS WITH MODIFIED METAL SALTS OF CORROSION RESISTING ORGANIC ANIONS

CROSS REFERENCE TO RELATED PATENTS AND PATENT APPLICATIONS

The present application is a non-provisional of U.S. Provisional Patent Application No. 60/904,925, filed Mar. 5, 2007.

The subject matter of the present invention is related to copending and commonly assigned U.S. patent application Ser. No. 10/454,347, filed Jun. 4, 2003, and to the U.S. Non-provisional, filed on the same date as the present application as a non-provisional of U.S. Provisional Patent Application No. 60/904,965, filed Mar. 5, 2007.

This invention was made with Government support under Contract Award N00421-05-C-0042 awarded by Naval Air Systems Command (NAVAIR). The Government has certain rights in the invention.

BACKGROUND OF THE INVENTION (1) Field of the Invention

The present invention relates to corrosion resistant agents and methods of making and using them to protect surfaces of metals that are subject to corrosion, and more particularly to corrosion-responsive agents that permit the use of reduced amounts of chromate or are free of chromate.

(2) Description of the Related Art

The protection of aluminum and aluminum alloys from corrosion is of wide interest, but in aircraft applications, it becomes critical. Aluminum alloys such as 2024 and 7075 are typical of the type used for aircraft service and these alloys characteristically contain copper. Although the presence of copper provides advantageous strength and other physical properties to the alloy, it nevertheless catalyzes the oxygen reduction reaction (ORR), which is a key element in corrosion processes.

The conventional method for protecting aircraft aluminum from corrosion involves the application of a conversion coating to the bare aluminum followed by applications of a primer and a topcoat. The topcoat provides the final color and surface texture and serves as a sealant for the undercoating. However, the conversion coating and the primer provide the majority of the corrosion resistance for the metal.

Chrome conversion coatings that contain hexavalent chromium are the present standard for use as conversion coatings for aluminum. Conventional hexavalent chrome conversion coatings meet Military Specification Mil-C-5541.

The present standard primer is a chromated epoxy primer meeting Military Specifications Mil-PRF-23377. Examples of this type of primer include Deft 02-Y-40A and Hentzen 16708TEP/16709CEH.

Typical topcoats for aircraft use meet Military Specification Mil-PRF-85285. Examples include Deft 03-GY-321 and Deft 99-GY-

SUMMARY OF THE INVENTION

Briefly, therefore the present invention is directed to a novel corrosion-responsive agent comprising a neutralized metal salt of a corrosion inhibiting organic anion, wherein a 2.5% by weight aqueous mixture of the dried salt has a pH that is above 6 and below 8.

The present invention is also directed to a novel method of making a corrosion-responsive agent comprising a neutralized metal salt of a corrosion inhibiting organic anion, the method comprising: providing a Zn(II), Al(III), Mg(II), Ca(II), Nd(III), Sr(II), Ti(IV), Zr(IV), Ce(III or IV), or Fe(II or III) salt of a corrosion inhibiting organic anion; and contacting the metal salt with a sufficient amount of a basic material to bring an aqueous mixture of the metal salt to a pH of above 6 and below 8.

The present invention is also directed to a novel method of using a corrosion-responsive agent comprising a neutralized metal salt of a corrosion inhibiting organic anion to reduce or prevent the corrosion of a metal that is subject to corrosion, the method comprising applying to a surface of the metal that is subject to corrosion a neutralized metal salt of a corrosion inhibiting organic anion, wherein a 2.5% by weight aqueous mixture of the dried salt has a pH that is above 6 and below 8.

BRIEF DESCRIPTION OF THE DRAWINGS

FIG. 5(a) illustrates a coating having one or more layers of a binder polymer (201) interspersed with one or more layers containing the neutralized metal salt, FIG. 5(b) illustrates a composite coating having touching regions of the binder polymer and the neutralized metal salt, and FIG. 5(c) illustrates a coating in which the neutralized metal salt can be combined in a layer with a binder polymer.

DETAILED DESCRIPTION OF PREFERRED EMBODIMENTS

Figure 1:
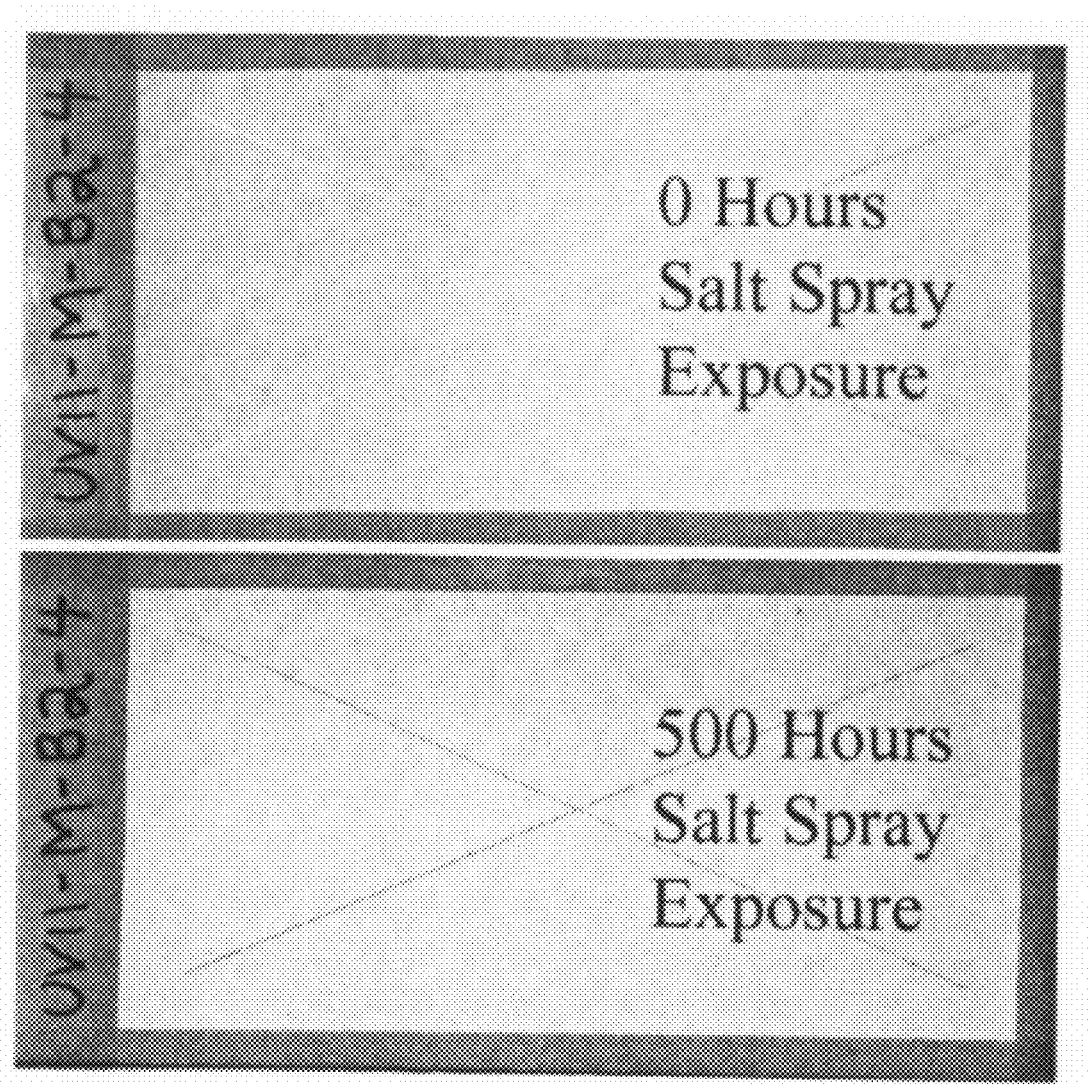
FIG. 1 shows a comparison showing darkening of scribe line after salt spray exposure for coupons having a primer that contains modified $Zn(DMcT)_2$ inhibitor which is applied over BAM-PPV pretreated 2024-T3 aluminum alloy.

In accordance with the present invention, it has been discovered that metals that are subject to corrosion can be protected against corrosion by applying to the metal's surface a neutralized metal salt of a corrosion inhibiting organic anion. The present metal salt is one that has been neutralized with a basic material to the point where a 2.5% by weight aqueous mixture of the dried salt has a pH that is above 6 and below 8. Accordingly, the neutralized metal salt is a combination of the metal salt of a corrosion inhibiting organic anion and sufficient basic material that a 2.5% by weight aqueous mixture of the dried combination has a pH at room temperature that is above 6 and below 8.

Although the present neutralized metal salt can be used in anti-corrosion coatings along with other corrosion-resisting agents, it has the advantage of being efficacious when it is used alone, in other words, free of other corrosion-resisting materials such as metal salts of cyanamide (for example zinc cyanamide or zinc phosphate) which have been used in combination with the zinc salt of 2,5-dimercapto-1,3,4-thiadiazole $(Zn(DMcT)_2)$ for corrosion resistance (See, U.S. Pat. No. 6,139,610 and U.S. Patent Application Publication US 2004/

02555819 A1). Accordingly, anti-corrosion coatings having an active agent that consists essentially of the neutralized metal salt of a corrosion inhibiting organic anion have been shown to be effective.

The present corrosion-responsive agent is preferably a neutralized Zn(II), Al(III), Mg(II), Ca(II), Nd(III), Sr(II), Ti(IV), Zr(IV), Ce(III or IV), or Fe(II or III) salt of a corrosion-inhibiting organic anion. In some embodiments, the metal salt is a zinc or neodymium salt of a corrosion-inhibiting organic anion.

The corrosion-inhibiting organic anion of the present invention can be an anion of a compound that is selected from the group consisting of mercapto-substituted organics and thio-substituted organics. Examples of useful corrosion-inhibiting organic anions include anions of a compound that is selected from the group consisting of 2,5-dimercapto-1,3,4-thiadiazole, 1-(4-hydroxyphenyl)-1H-tetrazol-5-thiol, 1,2,4-triazole-3-thiol, 1-pyrollidinecarbodithioic acid, 2,2'-dithio-bis(benzothiazole), 2,4-dimercapto-6-amino-5-triazine, 2,4-dithiohydantoin, 2,5-dimethylbenzothiazole, 2-amino-1,3,4-thiadiazole, 2-mercapto-5-methylbenzimidazole, 2-mercapto-5-nitrobenzimidazole, 2-mercaptobenzimidizole, 2-mercaptobenzoxazole, 2-mercaptoethane sulfonic acid, 2-mercaptoimidazole, 2-mercaptothiazoline, 2-thiouracil, 3-amino-5-mercapto-1,2,4-triazole, 5,5-dithio-bis(1,3,4-thiadiazole-2(3H)-thione, 5-amino-1,3,4-thiadiazole, 6-amino-2-mercaptobenzothiazole, 6-ethoxy-2-mercaptobenzothiazole, 6-mercaptopurine, -alky- or N-cycloalkyl-dithiocarbamates, alkyl- and cyclo-alkyl mercaptanes, benzothiazole, dimercapto pyridine, dimethyldithio carbamic acid, dithiocyanuric acid, mercaptobenzothiazole, mercaptobenzoxazole, mercaptoethanesulfonic acid, mercaptoimidazole, mercaptopyridine, mercaptopyrimidine, mercaptoquinoline, mercaptothiazole, mercaptothiazoline, mercaptotriazole, O,O-dialkyl- and O,O-dicycloalkyl-dithio-phosphates, O-alkyl- or O-cycloalkyl-dithiocarbonates, o-ethylxanthic acid, quinoxaline-2,3-thiol, thioacetic acid, thiocresol, thiosalicylic acid, trithiocyanuric acid, 6-ethoxy-2-mercaptobenzothiazole, 1,3,4 thiadiazole, 6-ethoxy-2-mercaptobenzothiazole, dimethyldithiocarbamic acid, o-ethylxanthic acid, 2-mercaptobenzothiazole, diethyldithiocarbamic acid, 5-amino-1,3,4,-thiadiazole-2-thiol, 2-mercaptobenzoxazole, 2,1,3-benzothiazole, 1-pyrollidinecarbodithioic acid, 1-(4-hydroxyphenyl)-1H-tetrazol-5-thiol, 2 mercapto-5-nitrobenzimidazole, benzothiazole, 2-mercaptobenzoazole, 2-mercapto-5-methylbenzimidazole, mercaptobenzothiazoles, mercaptothiazolines, mercaptobenzimidazoles, mercaptoimidazoles, 5,5-dithio-bis(1,3,4-thiadiazole-2(3H)-thione, mercaptobenzoxazoles, mercaptothiazole, mercaptotriazole, O-alkyl- or O-cycloalkyl-dithiocarbonates, O,O-dialkyl- and O,O-dicycloalkyl-dithiophosphates, dithiocyanuric acid, trithiocyanuric acid, 2,4-dithiohydantoin, 2,4-dimercapto-6-amino-5-triazine, and mixtures thereof.

In some embodiments, it is preferred that the corrosion-responsive agent comprises the neutralized Zn(II), Al(III), Mg(II), Ca(II), Nd(III), Sr(II), Ti(IV), Zr(IV), Ce(II or IV), or Fe(II or III) salt of 2,5-dimercapto-1,3,4-thiadiazole, and in particular, the neutralized Zn salt of 2,5-dimercapto-1,3,4-thiadiazole (DMcT).

As used herein with respect to metal salts of corrosion inhibiting organic anions, such as $Zn(DMcT)_2$, the term "neutralized" means that the metal salt is in combination with a sufficient amount of one or more basic materials to bring the pH of a 2.5% by weight aqueous mixture of the dried salt to above 6 and below 8. When the pH of a "dried salt" is referred to, what is meant is the pH at room temperature of a sample of the neutralized, methanol- and water-washed dried salt that has been resuspended at 2.5% by weight in deionized water.

The pH of the present dried salt can be above 6 and below 8, or above 6.2 and below about 7.6, or above 6.5 and below about 7.5, or be between about 6.8 and about 7.2. The pH of the present dried salt can be about 7.

The present invention also encompasses a method of making the neutralized metal salt of a corrosion inhibiting organic anion. In general, the method comprises providing a Zn(II), Al(III), Mg(II), Ca(II), Nd(III), Sr(II), Ti(IV), Zr(IV), Ce(III or IV), or Fe(II or III) salt of a corrosion inhibiting organic anion, and contacting the metal salt with a sufficient amount of a basic material to bring an aqueous mixture of the metal salt to a pH of above 6 and below 8. The step of providing the metal salt of a corrosion inhibiting organic anion can comprise contacting a nitrate salt of the metal with an acid form of the corrosion inhibiting organic anion in a methanol/water mixture and recovering the metal salt of the corrosion inhibiting organic anion as a precipitate. Once the metal salt is formed, it can be contacted with a basic material to provide an embodiment of the corrosion-responsive agent of the present invention.

The basic material can be any material having an alkaline pH, and can be any alkaline metal hydroxide or salt, such as KOH, $Na_3PO_4$, NaOH, or the like. Optionally, the basic material can be a Group IA metal salt of the corrosion inhibiting organic anion. In fact, it has been found that when the zinc salt of a corrosion inhibiting organic anion is used, either or both of the sodium or potassium salts of the same corrosion inhibiting organic anion are useful as basic materials for neutralizing the zinc salt to the desired pH.

By way of example, a useful method to produce the neutralized $Zn(DMcT)_2$ salt, includes the steps of:

contacting $Zn(NO_3)_2$ with DMcT in a methanol/water mixture; and recovering $Zn(DMcT)_2$ as a precipitate;

washing the precipitate with methanol and water; and contacting the $Zn(DMcT)_2$ with a basic material that is selected from the group consisting of $Na_2(DMcT)$, $K_2(DMcT)$, and mixtures thereof, in an amount sufficient to neutralize the $Zn(DMcT)_2$ salt to a point where a 2.5% by weight aqueous mixture of the dried salt has a pH between about 6.5 and about 7.2. The neutralized salt is ready for use in an aqueous-based coating without further processing. For use in a non-aqueous-based coating, the neutralized salt can be dried and milled.

The present corrosion-responsive agent can be used to inhibit, reduce, or prevent corrosion in the same manner as any other of the many well-known agents that have corrosion-protective capabilities. In one embodiment, the present neutralized metal salt can be included as a component of a corrosion resisting coating that can be applied to the surface of a metal that is subject to corrosion.

Because the present neutralized metal salt is free of chromium, the coating in which it is a component can be made to be either totally or substantially free of chromium (VI) and nevertheless provides excellent corrosion-protective qualities.

In one embodiment, a coating containing the present neutralized metal salt is applied to a metal surface having a chromium conversion coat. As will be understood by those having skill in the art of corrosion protective coatings, a conventional chromium corrosion protection system includes a chromium conversion coat (CCC), which is applied directly onto the metal surface, and a chromium-containing primer, which is applied over the CCC. Although both coatings contain Cr(VI), a toxic form of chromium, It is usual for the CCC to contain only a small fraction of the total chromium of the coating system (often only about 5%), while the primer contains the major portion of the chromium (often almost 95%). Accordingly, the replacement of a Cr(VI)-containing primer with the chromium-free primer containing the present neutralized metal salt reduces the chromium content of a coating system very significantly, even when the novel coating is applied over a CCC.

However, it has also been found that a coating containing the present neutralized metal salt can be applied over a chromium-free conversion coat, such as a conversion coating of poly [bis(2,5-(N,N,N',N'-tetralkyl)amine)-1,4-phenylene vinylene] (BAMPPV) as described by Anderson, N. and P. Zarras in *Currents,* 60-62, Spring 2005. This embodiment provides a chromium-free coating system that provides excellent corrosion protection.

It has been found that when a coating comprising a neutralized metal salt of an organic corrosion inhibiting anion such as DMcT is applied over a CCC, it is preferred that the salt of the organic corrosion inhibiting anion is isolated from contact with the CCC. This isolation can be provided, for example, by an intervening layer of a binder polymer. Alternatively, the corrosion resisting coating can comprise a binder polymer intermixed with the neutralized metal salt of a corrosion inhibiting organic anion.

The present corrosion-responsive agent can be advantageously applied to the surface of any metal that is subject to oxidative corrosion in order to prevent or reduce corrosion. In particular, it is useful for the protection of iron, steel and aluminum, and especially for aluminum alloys that contain copper. Some embodiments of coatings that employ the novel neutralized metal salt as applied to aluminum alloys such as 2024 and 7075 provided protection against corrosion in salt-spray environments that was equal to or better than the protection provided by conventional chromium coatings.

Anticorrosion coatings containing the present neutralized metal salt can be applied in many thickness that provides the desires qualities of corrosion-protection, flexibility, adhesion and durability. In some embodiments the thickness of the coating is from about 0.001 mm to about 0.2 mm, or from about 0.01 mm to about 0.1 mm, or from about 0.015 mm to about 0.025 mm.

Figure 5:
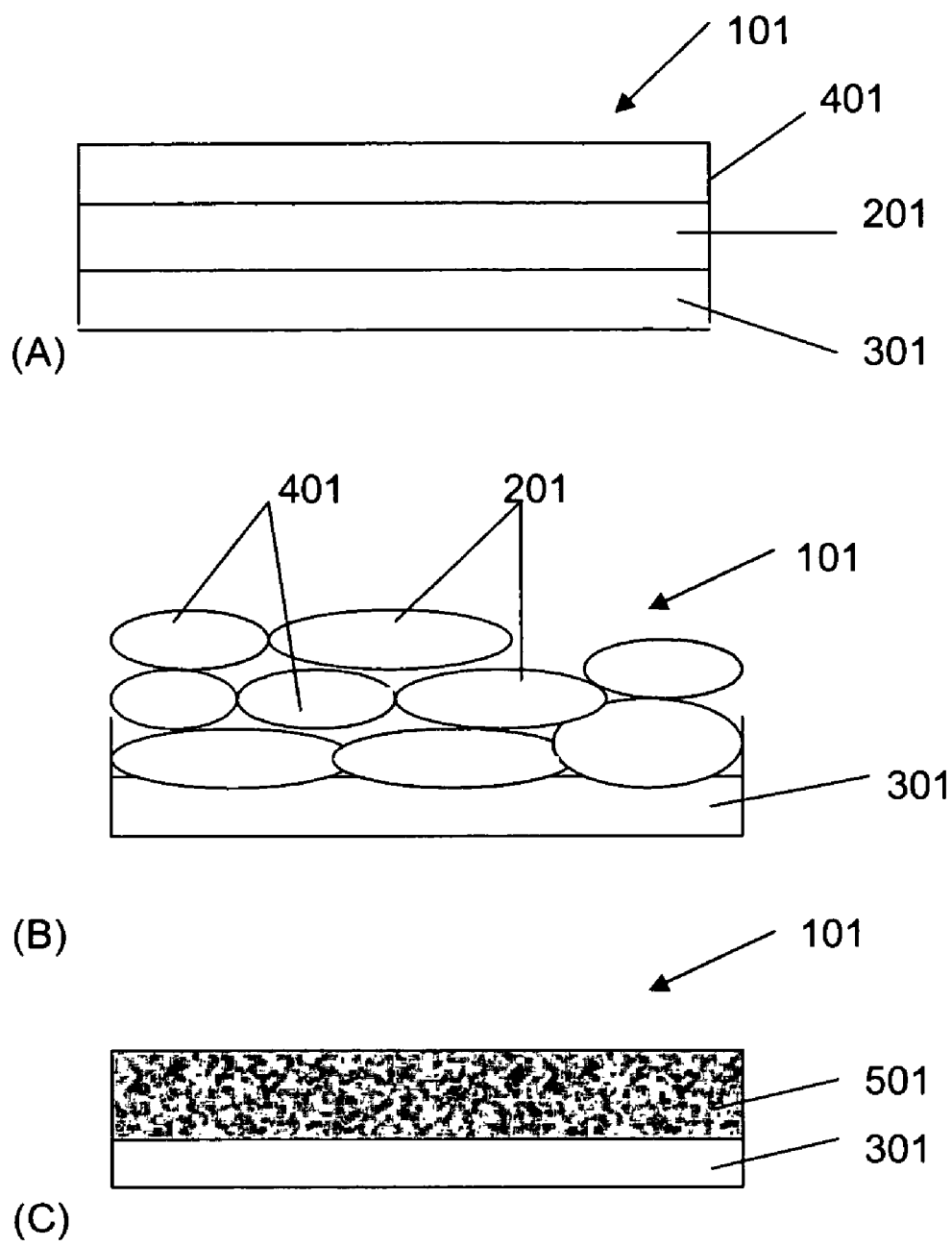
FIG. 5 illustrates several different embodiments of anticorrosion coatings that include the present neutralized metal salt, where

The present neutralized metal salt can be combined in a layer with a binder polymer (501) in a coating (101) of a metal substrate (301) as illustrated in FIG. 5(*c*), or can be included in coatings having one or more layers of a binder polymer (201) interspersed with layers containing the neutralized metal salt (401) as illustrated in FIG. 5(*a*), or can be included in composite coatings as shown in FIG. 5(*b*) having touching regions of the binder polymer (201) and the neutralized metal salt (401). Useful binder polymers for the present invention can be any polymer, copolymer, or a mixture of different polymers. The polymer can be a thermoplastic or a thermoset. Polymers that are useful as binder polymers in the present invention include phenolic resins, alkyd resins, aminoplast resins, vinyl alkyds, epoxy alkyds, silicone alkyds, uralkyds, epoxy resins, coal tar epoxies, urethane resins, polyurethanes, unsaturated polyester resins, silicones, vinyl acetates, vinyl acrylics, acrylic resins, phenolics, epoxy phenolics, vinyl resins, polyimides, unsaturated olefin resins, fluorinated olefin resins, cross-linkable styrenic resins, crosslinkable polyamide resins, rubber precursor, elastomer precursor, ionomers, mixtures and derivatives thereof, and mixtures thereof with crosslinking agents.

In a preferred embodiment of the present invention, the binder polymer is a cross-linkable polymer (a thermoset), such as the epoxy resins, polyurethanes, unsaturated polyesters, silicones, phenolic and epoxy phenolic resins. Exemplary cross-linkable resins include aliphatic amine-cured epoxies, polyamide epoxy, polyamine adducts with epoxy, kerimine epoxy coatings, aromatic amine-cured epoxies, silicone modified epoxy resins, epoxy phenolic coatings, epoxy urethane coatings, coal tar epoxies, oil-modified polyurethanes, moisture cured polyurethanes, blocked urethanes, two component polyurethanes, aliphatic isocyanate curing polyurethanes, polyvinyl acetals and the like, ionomers, fluorinated olefin resins, mixtures of such resins, aqueous basic or acidic dispersions of such resins, or aqueous emulsions of such resins, and the like. Methods for preparing these polymers are known or the polymeric material is available commercially. It should be understood that various modifications to the polymers can be made such as providing it in the form of a copolymer. The binder polymer can be aqueous based or solvent based and can be radiation-cured, cured by heat, by removal of a solvent, or by the action of a catalyst or promoter. Resins for the formation of binder polymers that are radiation cured can optionally contain reactive monomers and/or oligomers, and photoinitiators.

The binder polymer can be, or can include an intrinsically conductive polymer (ICP). As used herein, "intrinsically conducting polymer" means any polymer that is capable of conducting an electrical current in at least one valence state of the polymer. Generally, intrinsically conducting polymers are organic polymers that have poly-conjugated π-electron systems. Examples of suitable intrinsically conducting polymers for use in connection with the present invention include polyaniline, polypyrrole, polythiophene, poly(3-alkyl-thiophenes) such as poly(3-hexyl thiophene), poly(3-methyl thiophene) and poly-(3-octyl thiophene), poly-isothianapthene, poly-(3-thienylmethylacetate), polydiacetylene, polyacetylene, polyquinoline, polyheteroarylenvinylene, in which the heteroarylene group can be thiophene, furan or pyrrole, poly-(3-thienylethylacetate), and the like, and derivatives, copolymers and mixtures thereof. Some intrinsically conducting polymers exhibit the electrically conductive property naturally while others must be doped or charged to the proper valence state. ICPs typically exist in various valence states and are reversibly convertible into the various states by electrochemical reactions. For example, polyaniline can exist in numerous valence states such as a reduced state (leucoemeraldine), a partially oxidized state (emeraldine) and a fully oxidized state (pernigraniline). Polyaniline is most conductive in its emeraldine form (+2 electrons). This partially oxidized state of polyaniline can be formed by doping polyaniline with a suitable dopant to increase the electrical conductivity of the polymer. Examples of suitable dopants include tetracyanoethylene (TCNE), zinc nitrate, p-toluenesulfonic acid (PTSA), mercapto-substituted organic compound such as 2,5-dimercapto-1,3,4-thiadiazole, or any suitable mineral or organic acid. In a preferred embodiment, the ICP is polyaniline.

In addition to the binder polymer, coatings containing the present neutralized metal salt can contain other materials. Any plasticizer, colorant, curing catalyst, residual monomer, surfactant, or any other material that adds useful properties to the coating, or at least does not reduce the functionality of the coating, can be included in the coating in amounts that are known to those of skill in the art of polymer compounding.

If the present neutralized metal salt is formed into a coating by intermixing with a binder polymer, it can be used in any amount or concentration that provides corrosion protection. The metal salt can be included in the coating in an amount of from about 1% to about 50% by weight, preferably from about 5% to about 40%, or from about 10% to about 35%, and also from about 15% to about 30%, all by weight of the coating.

Alternatively, the neutralized metal salt can be used in multi-layered coatings having layers of binder polymer interspersed with layers containing the neutralized metal salt. In the layers containing the neutralized metal salt, it can be present in an amount that is at least equal to the critical pigment volume concentration (CPVC), or even higher.

In some embodiments, the neutralized metal salt is provided in the form of fine particles that are intermixed in a resin that cures to form the binder polymer or a different polymer. As used herein, the terms, "critical pigment volume concentration", or "CPVC", refer to the point at which there is just sufficient polymer to wet the pigment particles. Below the CPVC there is sufficient polymer for wetting all of the particles of the corrosion-responsive agent and above the CPVC there is not. There can be abrupt changes in the coating properties at the CPVC.

In the present invention a coating containing the present neutralized metal salt can be formed in any manner. In one useful method, the coating is formed by applying to the material to be protected a liquid formulation that cures to form the coating. The liquid formulation can be solvent-free or it can contain a solvent. The formulation can be aqueous-based, organic-based, or a mixture of the two. Typically it contains the components of the coating with or without a solvent in a liquid solution, emulsion, micro-emulsion, dispersion, or mixture. After the liquid formulation is applied to the surface, or to a coating that has previously been applied to the surface, it can be cured to form a solid coating. It is common for the liquid formulation to be applied as a layer, or in the form of small droplets as a spray.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered to be exemplary only, with the scope and spirit of the invention being indicated by the claims which follow the examples. In the examples all percentages are given on a weight basis unless otherwise indicated.

Example 1

This illustrates an embodiment of the method of producing neutralized metal salt of zinc(2,5-dimercapto-1,3,4-thiadiazole).

$Zn(DMcT)_2$ is formed by dissolving zinc nitrate in methanol and adding this solution to a solution of DMcT in methanol. A precipitate of the formula having the formula $Zn(DMcT)_2$ forms. Methanol is removed and the product is ground as an aqueous slurry in a jar mill to reduce particle size until a Hegman grind of 5 or higher is achieved. In order to form the neutralized metal salt of $Zn(DMcT)_2$, the metal salt is contacted with one or more neutralizing compounds. Useful neutralizing compounds include organic and inorganic bases. Inorganic bases such as NaOH, $PO_4=$, KOH, LiOH, ammonium, MgOH, and the like can be used as neutralizing compounds. Also, the neutralizing compound can be an alkali metal salt of a thiol or an alkali earth metal salt of a thiol. As an example, the disodium or dipotassium salt of DMcT can be used to increase the pH of the $Zn(DMcT)_2$ slurry to a range of above 6 and below 8.

If the agent is to be used in water-borne coatings, no further processing is required. For solvent-borne coatings, the product can be dried and reground/dispersed in an organic solvent such as xylene, again using a jar mill until a Hegman grind of 5 or greater is obtained.

Table 1 shows the conditions of several synthesis procedures for the production of $Zn(DMcT)_2$. Runs 1-3 illustrate the production starting from the crystalline hexahydrate of zinc nitrate and runs 4-6 start with a 50% aqueous solution of zinc nitrate. The $Zn(DMcT)_2$ produced in runs 1-6 is not further neutralized. Conditions and results of the neutralization of the $Zn(DMcT)_2$ salt by either $K_2(DMcT)$ or $Na_2(DMcT)$ is shown for runs 7-9.

Dried product pH measurement is carried out by using a mortar and pestle to grind ½ gram of the dried metal salt. A 0.25 gm sample is recovered and mixed with 9.75 grams of filtered DI water in a 6 dram vial. The pH is measured after 5 minutes at room temperature. This gives the pH of a 2.5% by weight aqueous mixture of the dried product.

TABLE 1

Synthesis of $Zn(DMcT)_2$ and neutralized $Zn(DMcT)_2$.

| Run No. | $Zn(NO_3)_2·6H_2O$ (gm) | 50% $Zn(NO_3)_2$ solution (gm) | MeOH added to Zn salt (ml) | DMcT (gm) | MeOH with DMcT (ml) | MeOH Wash #1 (ml) | Water wash (ml) |
|---|---|---|---|---|---|---|---|
| 1 | 27 | | 130 | 6.5 | 180 | 100 | 60 |
| 2 | 27 | | 130 | 6.5 | 180 | 100 | 60 |
| 3 | 27 | | 34.08 | 6.5 | 180 | 100 | 60 |
| 4 | | 9.01 | 43.33 | 6.5 | 90 | 100 | 60 |
| 5 | | 9.01 | 0 | 6.5 | 90 | 100 | 60 |
| 6 | | 9.01 | 0 | 6.5 | 46.8 | 100 | 60 |
| 7 | 27 | | 130 | 6.5 | 180 | 100 | 60 |
| 8 | | 27.04 | 40.56 | 19.5 | 270 | 300 | 180 |
| 8A unmilled | | | | | | | |
| 8B milled | | | | | | | |
| 8C milled | | | | | | | |
| 9 | | 162.24 | 310 | 117 | 1621 | 1800 | 1080 |
| 9A unmilled | | | | | | | |
| 9B milled | | | | | | | |

TABLE 1-continued

Synthesis of Zn(DMcT)$_2$ and neutralized Zn(DMcT)$_2$.

| Run No. | Yield of Zn(DMcT)$_2$ (gm) | Yield (%) | pH of unneutralized product at 2.5% by wt. | Base added (gm) | pH of neutralized aqueous mixture at 30 min. | Dried product pH at 2.5% by wt. |
|---|---|---|---|---|---|---|
| 1 | 7.56 | 96.1 | 4.34 | | | |
| 2 | 7.47 | 94.9 | 4.62 | | | |
| 3 | 7.56 | 96.1 | 4.51 | | | |
| 4 | 7.54 | 95.8 | 4.32 | | | |
| 5 | 7.61 | 96.7 | 3.82 | | | |
| 6 | 7.65 | 97.2 | 3.03 | | | |
| 7 | 7.47 | 94.9 | 4.59 | 4.77 K$_2$(DMcT) | 7.24 | 6.79 |
| 8 | | | | | | |
| 8A unmilled | 7.34 | 93.3 | 4.54 | 4.75 K$_2$(DMcT) | 7.83 | 6.24 |
| 8B milled | 7.14 | 90.7 | 4.2 | 4.78 K$_2$(DMcT) | 7.59 | 6.6 |
| 8C milled | 7.16 | 91 | 4.28 | 4.2 Na$_2$(DMcT) | 7.59 | 7 |
| 9 | | | | | | |
| 9A unmilled | 109 | | 3.95 | 145 Na$_2$(DMcT) | 7.02 | 6.7 |
| 9B milled | | | 4.55 | 20 Na$_2$(DMcT) | 7.24 | — |

Elemental Analysis

The elemental analysis of a sample of neutralized Zn(DMcT)$_2$ produced according to an embodiment of the present method is shown in Table 2.

TABLE 2

Elemental analysis of Zn(DMcT)$_2$ prior to neutralization

| Element | Experimental % mass | Molar Ratio |
|---|---|---|
| Carbon | 13.23 | 1.10 |
| Hydrogen | 0.64 | 0.63 |
| Nitrogen | 15.04 | 1.07 |
| Oxygen | 0.00 | na |
| Sulfur | 51.24 | 1.60 |
| Zinc | 18.6 | 0.28 |
| Totals | 98.75 | |

One of the most important uses for the data in Table 2 is the determination of the formula for Zn(DMcT)$_2$. Comparing the molar ratios of carbon to zinc:

C=1.1, Zn=0.28 (moles carbon)/(moles zinc)=3.93 implies a formula of: Zn(C$_2$HN$_2$S$_3$)$_2$.

Apparently, under the conditions used for the precipitation, Zn$^{2+}$ is replacing only the most acidic proton of DMcT.

Example 2

This illustrates the use of neutralized Zn(DMcT)$_2$ in anti-corrosion coatings applied by flow coating and with a spray.

Anti-corrosion coatings containing Zn(DMcT)$_2$ were applied to metal coupons by draw-bar coating and by spraying as described below. Coatings were multi-layer and were formed by an initial coat of the solvent borne epoxy primer having the formulation shown in Table 3, followed by a coat of the Zn(DMcT)$_2$ in xylene. Coatings received a topcoat of the epoxy primer.

Formulations:

TABLE 3

Solvent-borne epoxy primer (P5), non-chromated.

| | Material | Grams | Wt. % | Density (lbs/gal) | Density (g/ml) | % Solids | Solids | Volume (Solids) | 2x |
|---|---|---|---|---|---|---|---|---|---|
| Part A | EPON 1007-HT-55 | 105.00 | 18.22 | 8.60 | 1.03 | 55.00 | 57.75 | 59.60 | 210.00 |
| | EPON 1001-B-80 | 62.50 | 10.84 | 9.20 | 1.10 | 80.00 | 50.00 | 55.00 | 125.00 |
| | Anti-Terra U | 0.66 | 0.11 | | | | | | 1.32 |
| | Xylene | 16.67 | 2.89 | | | | | | 33.33 |
| | Ektasolve EEP | 20.00 | 3.47 | | | | | | 40.00 |
| | Ti Pure R706 | 90.00 | 15.61 | 33.00 | 3.96 | 100.00 | 90.00 | 22.73 | 180.00 |
| | ZP-10 Zinc Phosphate | 0.00 | 0.00 | 27.52 | 3.30 | 100.00 | 0.00 | 0.00 | 0.00 |
| | Sparmite Barium Sulfate | 90.00 | 15.61 | 36.56 | 4.39 | 100.00 | 90.00 | 20.51 | 180.00 |
| | Zeeosphere 400 | 90.00 | 15.61 | 18.30 | 2.20 | 100.00 | 90.00 | 40.98 | 180.00 |
| | Water Ground Mica 325 Mesh | 10.00 | 1.73 | 25.00 | 3.00 | 100.00 | 10.00 | 3.33 | 20.00 |
| | Ball Mill to Hegman 7 | | 0.00 | | | | | | |
| | Xylene | 19.40 | 3.37 | | | | | | 38.80 |
| | | | 0.00 | | | | | | 1008.45 |

TABLE 3-continued

Solvent-borne epoxy primer (P5), non-chromated.

| | Material | Grams | Wt. % | Density (lbs/gal) | Density (g/ml) | % Solids | Solids | Volume (Solids) | 2x |
|---|---|---|---|---|---|---|---|---|---|
| Part B | EPI-CURE 3213 | 31.95 | 5.54 | 8.06 | 0.97 | 100.00 | 31.95 | 30.91 | 63.90 |
| | MEK | 20.80 | 3.61 | | | | | | 41.60 |
| | Isopropanol | 19.45 | 3.37 | | | | | | 38.90 |
| | | 576.43 | 100.00 | | | | | | 144.40 |
| | | | % PVC = (pigment vol × 100)/(pig vol + resin volume solids) | | | | | PVC | 37.57 |

BMDCInk P5 Primer
9 grams A + 3 grams B + butylcellosolve for viscosity adjustment Binder polymer and Zn(DMcT)$_2$ coating formulations were applied by spin coating 3"×3" panels at 500 rpm. Solvents were flashed off at 80° C. for about 15 minutes between coating each layer, both the paint and the zinc salt. Most formulations were applied to CCC 2024-T3 for corrosion testing. Prior to corrosion testing, coated panels were scribed with a mechanical scriber and taped with electroplater's tape. Corrosion testing was performed according to ASTM B117. Thickness measurements made with a Positector 6000-N2 (DeFelsko)

Some of the coatings were applied "wet-on-wet", meaning that the layers were not given time to dry between applications of each layer in a manner similar to methods now used to coat aircraft.

Testing of Formulations
Salt Spray Testing

Spray-applied primers and draw-down bar applied primers were tested according to MIL-PRF-2377J, section 4.5.8.1 and ASTM B117. A Q-Fog SSP600 (Q-Panel) cabinet was used for salt spray exposure. Primers were applied to chromate conversion coated 2024-T3 substrate and allowed to cure for a minimum of two weeks at ambient conditions prior to scribing and testing. To promote better adhesion between the primer and conversion coating, primer application was performed within three to four days of conversion coating application.

One finding was that the layered coating schemes could be applied by spray application as well as a spin coat application. Also, it was possible to apply layers "wet-on-wet", i.e. layers were applied over each other without drying between layers. This could make the layered coating approach a much more practical solution to the problem of inhibitor/resin incompatibility.

Before primer application, CCC's were tested for water breaks and for dilute acid resistance (4% nitric acid drop placed on the chromate conversion coating for ten minutes should not damage the CCC).

Results from these tests showed:

Neutralized Zn(DMcT)$_2$ was used in the layered coatings, and it produced successful results. Three out of three panels were passing at 880 hours of salt spray exposure.

Non-chromated primers applied to bare aluminum (without chromate conversion coating) did not perform as well as when they were applied over chromate conversion coated aluminum.

Example 3

This illustrates spin-coated coatings containing Zn(DMcT)$_2$ and the application of layer-by-layer systems with a spray gun as described in Example 2.

The binder polymer used was a solvent-borne, high solids formulation falling under MIL-PRF-23377J, having the composition shown above in Table 3. Parts A and B were mixed and applied between thirty minutes and four hours after mixing.

Figure 2:
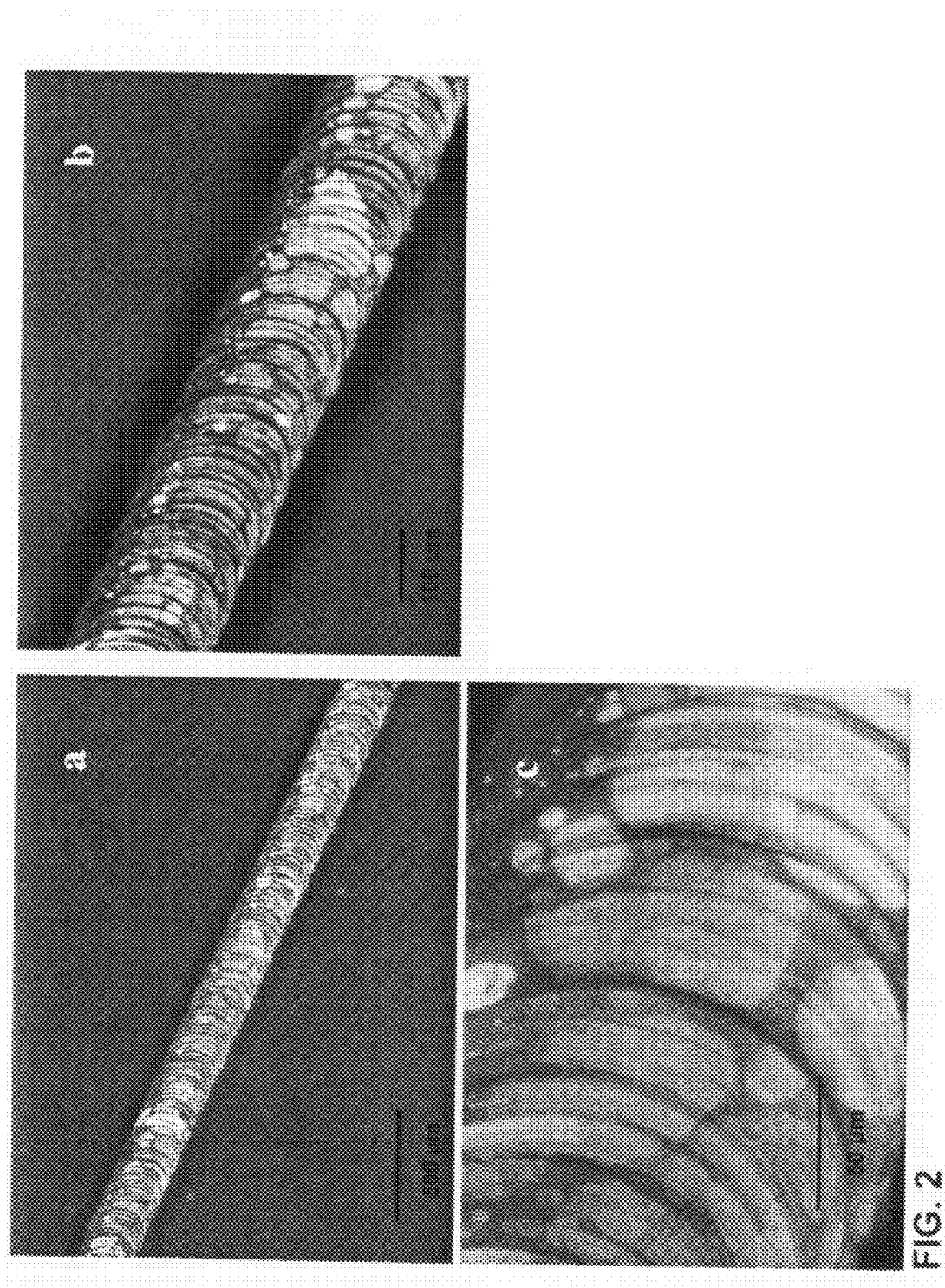
FIGS. 2(a), 2(b), and 2(c) are optical micrographs of scribe lines after 1500 hours of salt spray exposure in which no pitting seen and in which the color that is seen in scribe lines (see FIG. 1) may be related to a coating forming on the metal.

Neutralized Zn(DMcT)$_2$ was used in the layered coatings, and it produced successful results. An example of a layered coating containing modified Zn(DMcT)$_2$ is shown in FIG. 1 and FIG. 2. Three out of three panels were passing at 2500 hours of salt spray exposure. This was in spite of poor distribution of the inhibitor across the panel surface as layers were applied. Additional work with this inhibitor used spray application of inhibitor slurries in xylene.

Example 4

This example illustrates the application of coatings of an embodiment of the present invention by spraying using either a layered scheme or a composite scheme in which two separate sprays were applied simultaneously to obtain a composite coating.

Figure 3:
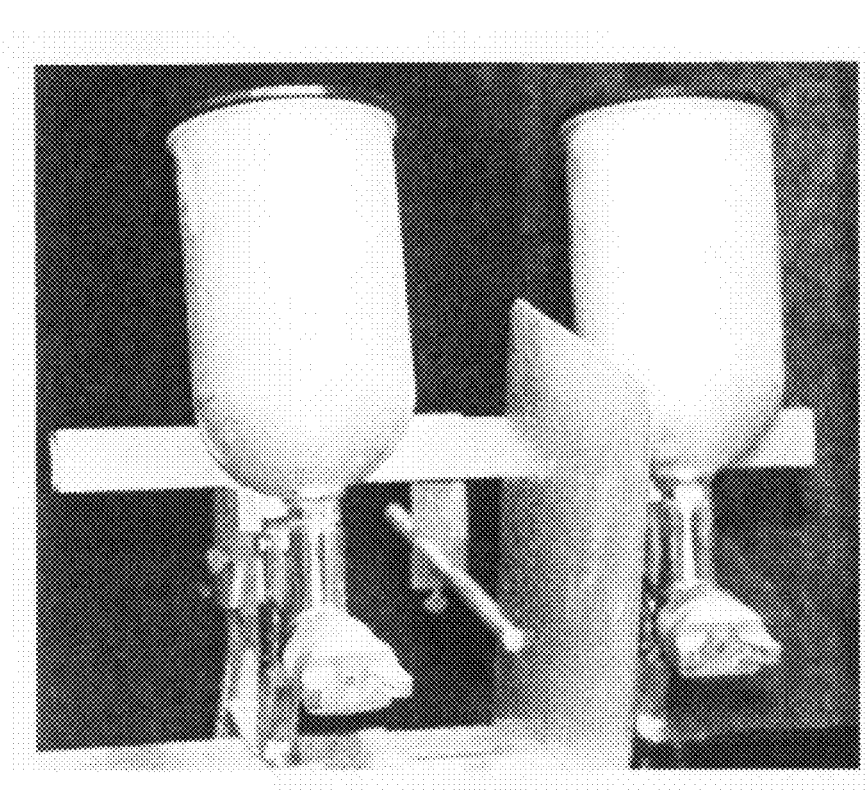
FIG. 3 shows a dual spray gun set-up for spraying multiple, discreet layers, where the guns are aimed parallel and separator is installed.
Figure 4:
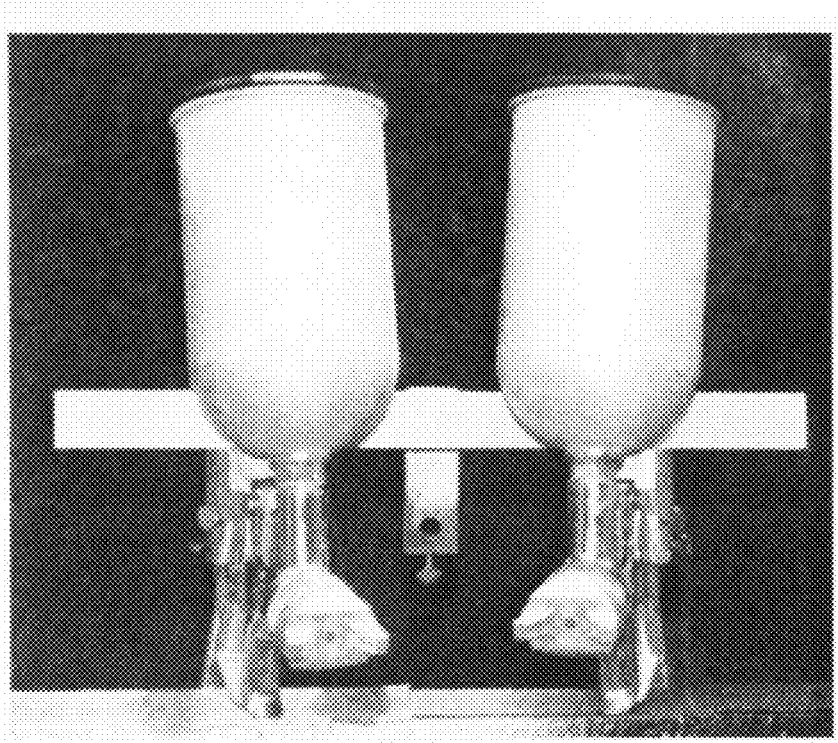
FIG. 4 shows a dual spray gun set-up for applying mixed sprays of primer and inhibitor, where the separator is removed and the guns are aimed inward to give spray patterns that overlap at or before the surface of the metal target.

Goals of this test were to: use a spray application to reproduce layered coatings similar to those described in Example 2 which had been originally applied by spin coating, use a dual spray-gun set-up to make the layered approach more practical by applying the layers with the same apparatus, modifying the dual spray gun to test whether or not mixing the resin and the inhibitor spray streams would work as well as applying the resin and inhibitor in separate layers—coatings could be applied in a single layer using this system, including neutralized Zn(DMcT)$_2$ in spray-applied coatings, and by allowing panels to cure at room temperature for two weeks prior to testing instead of using an accelerated cure schedule Formulations/Application The primer was of the same formulation as described in Examples 2 and 3. The coatings were applied from two gravity fed spray-guns mounted to a bar about eighteen inches in length. With this configuration, both guns could be operated simultaneously. One gun contained the high-solids epoxy primer while the other gun contained a slurry of the CRA which had been ground and dispersed in xylene. For those coatings with multiple layers, a partition was put in place between the spray streams of the guns (See FIG. 3). For primer coatings applied as mixed sprays, the partition was removed and the spray-guns were angled inward towards each other (FIG. 4). Various coating schemes contained four non-chrome inhibitors—DMcT, polyDMcT, PANiDMcT and neutralized Zn(DMcT)$_2$. Also included was a set of chromate controls spray-applied in a conventional manner.

Salt Spray Testing

The coatings in this example were designed to follow-up promising results of spin-coated specimens described in Examples 2 and 3. The coatings described in Example 2 included the first attempt at layering the coatings with a spray application. Unfortunately, the spray-applied coatings in that example performed poorly in salt spray tests. The salt spray results from the present experiment were much better through the first 1000 hours of testing.

Important Findings:

"Mixed spray" with PANiDMcT worked best, followed by multiple layers of PolyDMcT;

The mixed spray coating scheme was easier to apply than the multi-layered primers;

Neutralized $Zn(DMcT)_2$ in a multi-layer system showed promising results. One panel out of three was passing at 1000 hours, but of the two failing panels, one had a defective scribe which appears to be related to the failure;

PANiDMcT only worked well in the mixed spray approach. It did not show good inhibition in the layered approaches;

In the layered approaches, a coating scheme with a single layer of inhibitor followed by a single layer of primer did not work as well as multiple, alternating layers;

The chromate control primer did not provide any more inhibition than the top performing primers from this set;

While many panels technically failed between the 500 hour and 1000 hour marks, many of these were failed because of barely detectable areas of salting in the scribes. These areas comprised less than a few percent of the scribe length, yet the rest of the scribe was perfectly shiny; and Blistering was scarcely a problem with this set, unlike in Example 3. This may be because of better chromate conversion coatings or because of curing panels two weeks at room temperature rather than accelerating their cure at elevated temperature.

Flexibility Testing:

Flexibility testing was problematic for this set. The coatings containing non-chrome CRA's failed while the chromate control and one of the negative (no CRA) controls passed. At first glance, the failures appear to be related to whether or not the coating contained a non-chrome CRA; however, coating thickness may have played a large role in what passed or failed. The negative control was tested in two different versions, a single layer and a thicker, multi-layer coating. The recommended coating thickness range by the military specifications is 0.6 to 0.9 mils. The single layer coating, which passed, had a coating thickness of 0.5 mils. The multi-layer coating, which failed, had a coating thickness of 1.4 mils. The chromate control, which passed, had a coating thickness of 0.4 mils. Two of the coatings containing non-chrome CRA's came very close to passing and were noted as borderline failures. The thicknesses of these two coatings fell within the range recommended by the military specifications and were thus thicker than the two control coatings which passed. For this reason, it is believed that the CRA's are having little, if any, detrimental impact on flexibility, and that the flexibility failures may be dealt with by adjusting the formulation.

Adhesion

All specimens tested passed the dry tape adhesion test.

Results from the wet tape adhesion tests may not have been accurate, but they may have proven that good adhesion is still attainable with the layered coating approach. All but one coating system failed. The failures included the chromate and negative controls. For this reason, it is suspected that something was performed improperly during the coating application or test, perhaps during the surface preparation prior to painting. Despite the problems, the results suggest that good adhesion results are attainable for the multi-layer systems.

Continued testing of coatings of this example resulted in the following findings:

Through the first 1000 hours, "Mixed spray" forming a composite coating with PANiDMcT worked best overall, followed by multiple layers of polyDMcT. After the 1500 and 2000 hour mark, performance of the mixed spray PANiDMcT panels faded quickly. There seemed to be a slight change in color during this time. If this color change is due to dedoping, then the color change may correlate with deteriorating corrosion protection because dedoping means that the inhibitor has been depleted. The performance of the best neutralized $Zn(DMcT)_2$ sets was not as good over the first 1000 hours, but they held up better than either the polyDMcT or the PANiDMcT beyond the 2000 hour mark.

In the mixed spray method alone, neutralized $Zn(DMcT)_2$ and PANiDMcT produced the best results. PANiDMcT was comparable to the chromate controls for the first 1500 to 2000 hours before degrading significantly. The mixed spray $Zn(DMcT)_2$ lasted longer and was comparable to the chromate controls at 3000 hours when the test was terminated.

PANiDMcT only worked well in the mixed spray approach. It did not show good inhibition in the layered approaches.

In the layered approaches, a coating scheme with a single layer of inhibitor followed by a single layer of primer generally did not work as well as multiple, alternating layers.

The chromate control primer did not provide any more inhibition than the top performing primers from this set.

While many panels technically failed between the 500 hour and 1000 hour marks, many of these were failed because of barely detectable areas of salting in the scribes. These areas comprised less than a few percent of the scribe length, yet the rest of the scribe was perfectly shiny.

All references cited in this specification, including without limitation all papers, publications, patents, patent applications, presentations, texts, reports, manuscripts, brochures, books, internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinency of the cited references.

In view of the above, it will be seen that the several advantages of the invention are achieved and other advantageous results obtained.

As various changes could be made in the above methods and compositions by those of ordinary skill in the art without departing from the scope of the invention, it is intended that all matter contained in the above description and shown in the accompanying drawings shall be interpreted as illustrative and not in a limiting sense. In addition it should be understood that aspects of the various embodiments may be interchanged both in whole or in part.

What is claimed is:

1. A corrosion-responsive agent comprising a neutralized metal salt of a corrosion-inhibiting organic anion, wherein a 2.5% by weight aqueous solution of the dried salt has a pH that is above 6 and below 8, wherein the agent is substantially free of zinc phosphate.

2. The corrosion-responsive agent according to claim 1, wherein the neutralized metal salt comprises a Zn(II), Al(III), Mg(II), Ca(II), Nd(III), Sr(II), Ti(IV), Zr(IV), Ce(III or IV), or Fe(II or III) salt of a corrosion-inhibiting organic anion.

3. The corrosion-responsive agent according to claim 1, wherein the neutralized metal salt comprises a zinc or neodymium salt of a corrosion-inhibiting organic anion.

4. The corrosion-responsive agent according to claim 1, wherein the corrosion-inhibiting organic anion comprises an anion of a compound that is selected from the group consisting of mercapto-substituted organics and thio-substituted organics.

5. The corrosion-responsive agent according to claim 1, wherein the corrosion-inhibiting organic anion comprises an anion of a compound that is selected from the group consisting of 2,5-dimercapto-1,3,4-thiadiazole, 1-(4-hydroxyphenyl)-1H-tetrazol-5-thiol, 1,2,4-triazole-3-thiol, 1-pyrollidinecarbodithioic acid, 2,2'-dithiobis(benzothiazole), 2,4-dimercapto-6-amino-5-triazine, 2,4-dithiohydantoin, 2,5-dimethylbenzothiazole, 2-amino-1,3,4-thiadiazole, 2-mercapto-5-methylbenzimidazole, 2-mercapto-5-nitrobenzimidazole, 2-mercaptobenzimidizole, 2-mercaptobenzoxazole, 2-mercaptoethane sulfonic acid, 2-mercaptoimidazole, 2-mercaptothiazoline, 2-thiouracil, 3-amino-5-mercapto-1,2,4-triazole, 5,5-dithio-bis(1,3,4-thiadiazole-2(3H)-thione, 5-amino-1,3,4-thiadiazole, 6-amino-2-mercaptobenzothiazole, 6-ethoxy-2-mercaptobenzothiazole, 6-mercaptopurine, -alky- or N-cycloalkyl-dithiocarbamates, alkyl- and cyclo-alkyl mercaptanes, benzothiazole, dimercapto pyridine, dimethyldithio carbamic acid, dithiocyanuric acid, mercaptobenzothiazole, mercaptobenzoxazole, mercaptoethanesulfonic acid, mercaptoimidazole, mercaptopyridine, mercaptopyrimidine, mercaptoquinoline, mercaptothiazole, mercaptothiazoline, mercaptotriazole, O,O-dialkyl- and O,O-dicycloalkyl-dithiophosphates, O-alkyl- or O-cycloalkyl-dithiocarbonates, o-ethylxanthic acid, quinoxaline-2,3-thiol, thioacetic acid, thiocresol, thiosalicylic acid, trithiocyanuric acid, 6-ethoxy-2-mercaptobenzothiazole, 1,3,4 thiadiazole, 6-ethoxy-2-mercaptobenzothiazole, dimethyldithiocarbamic acid, o-ethylxanthic acid, 2-mercaptobenzothiazole, diethyldithiocarbamic acid, 5-amino-1,3,4,-thiadiazole-2-thiol, 2-mercaptobenzoxazole, 2,1,3-benzothiazole, 1-pyrollidinecarbodithioic acid, 1-(4-hydroxyphenyl)-1H-tetrazol-5-thiol, 2 mercapto-5-nitrobenzimidazole, benzothiazole, 2-mercaptobenzoazole, 2-mercapto-5-methylbenzimidazole, mercaptobenzothiazoles, mercaptothiazolines, mercaptobenzimidazoles, mercaptoimidazoles, 5,5-dithio-bis(1,3,4-thiadiazole-2(3H)-thione, mercaptobenzoxazoles, mercaptothiazole, mercaptotriazole, O-alkyl- or O-cycloalkyl-dithiocarbonates, O,O-dialkyl- and O,O-dicycloalkyl-dithiophosphates, dithiocyanuric acid, trithiocyanuric acid, 2,4-dithiohydantoin, 2,4-dimercapto-6-amino-5-triazine, and mixtures thereof.

6. The corrosion-responsive agent according to claim 2, comprising the Zn(II), Al(III), Mg(II), Ca(II), Nd(III), Sr(II), Ti(IV), Zr(IV), Ce(III or IV), or Fe(II or III) salt of 2,5-dimercapto-1,3,4-thiadiazole.

7. The corrosion-responsive agent according to claim 1, comprising a neutralized Zn salt of 2,5-dimercapto-1,3,4-thiadiazole (DMcT).

8. The corrosion-responsive agent according to claim 1, comprising $Zn(DMcT)_2$ and a Group IA metal salt of DMcT.

9. The corrosion-responsive agent according to claim 1, comprising $Zn(DMcT)_2$ and either or both of $Na_2(DMcT)$ and $K_2(DMcT)$.

10. The corrosion-responsive agent according to claim 1, wherein a 2.5% by weight aqueous solution of the salt has a pH between about 6.5 and about 7.2.

11. The corrosion-responsive agent according to claim 1, contained in a corrosion resisting coating on the surface of a metal that is subject to corrosion.

12. The corrosion-responsive agent according to claim 11, wherein the corrosion resisting coating comprises a chromate conversion coating directly adhered to the surface of the metal, a layer of a binder polymer covering the chromate conversion coating, and a layer comprising the corrosion-responsive agent covering the layer of binder polymer.

13. The corrosion-responsive agent according to claim 11, wherein the corrosion resisting coating comprises a binder polymer intermixed with the neutralized metal salt of a corrosion-inhibiting organic anion.

14. A method of making a corrosion-responsive agent comprising a neutralized metal salt of a corrosion-inhibiting organic anion, the method comprising:
providing a first metal salt of a corrosion-inhibiting organic anion, wherein the metal salt is selected from one or more of Zn(II), Al(III), Mg(II), Ca(II), Nd(III), Sr(II), Ti(IV), Zr(IV), Ce(III or IV), or Fe(II or III) salt; and
contacting the first metal salt with a Group IA metal salt of a corrosion-inhibiting organic anion of a compound that is selected from the group consisting of 2,5-dimercapto-1,3,4-thiadiazole, 1-(4-hydroxyphenyl)-1H-tetrazol-5-thiol, 1,2,4-triazole-3-thiol, 1-pyrollidinecarbodithioic acid, 2,2'-dithiobis(benzothiazole), 2,4-dimercapto-6-amino-5-triazine, 2,4-dithiohydantoin, 2,5-dimethylbenzothiazole, 2-amino-1,3,4-thiadiazole, 2-mercapto-5-methylbenzimidazole, 2-mercapto-5-nitrobenzimidazole, 2-mercaptobenzimidizole, 2-mercaptobenzoxazole, 2-mercaptoethane sulfonic acid, 2-mercaptoimidazole, 2-mercaptothiazoline, 2-thiouracil, 3-amino-5-mercapto-1,2,4-triazole, 5,5-dithio-bis(1,3,4-thiadiazole-2(3H)-thione, 5-amino-1,3,4-thiadiazole, 6-amino-2-mercaptobenzothiazole, 6-ethoxy-2-mercaptobenzothiazole, 6-mercaptopurine, -alky- or N-cycloalkyl-dithiocarbamates, alkyl- and cyclo-alkyl mercaptanes, benzothiazole, dimercapto pyridine, dimethyldithio carbamic acid, dithiocyanuric acid, mercaptobenzothiazole, mercaptobenzoxazole, mercaptoethanesulfonic acid, mercaptoimidazole, mercaptopyridine, mercaptopyrimidine, mercaptoquinoline, mercaptothiazole, mercaptothiazoline, mercaptotriazole, O,O-dialkyl- and O,O-dicycloalkyl-dithiophosphates, O-alkyl- or O-cycloalkyl-dithiocarbonates, o-ethylxanthic acid, quinoxaline-2,3-thiol, thioacetic acid, thiocresol, thiosalicylic acid, trithiocyanuric acid, 6-ethoxy-2-mercaptobenzothiazole, 1,3,4 thiadiazole, 6-ethoxy-2-mercaptobenzothiazole, dimethyldithiocarbamic acid, o-ethylxanthic acid, 2-mercaptobenzothiazole, diethyldithiocarbamic acid, 5-amino-1,3,4,-thiadiazole-2-thiol, 2-mercaptobenzoxazole, 2,1,3-benzothiazole, 1-pyrollidinecarbodithioic acid, 1-(4-hydroxyphenyl)-1H-tetrazol-5-thiol, 2 mercapto-5-nitrobenzimidazole, benzothiazole, 2-mercaptobenzoazole, 2-mercapto-5-methylbenzimidazole, mercaptobenzothiazoles, mercaptothiazolines, mercaptobenzimidazoles, mercaptoimidazoles, 5,5-dithio-bis(1,3,4-thiadiazole-2(3H)-thione, mercaptobenzoxazoles, mercaptothiazole, mercaptotriazole, O-alkyl- or O-cycloalkyl-dithiocarbonates, O,O-dialkyl- and O,O-dicycloalkyl-dithiophosphates, dithiocyanuric acid, trithiocyanuric acid, 2,4-dithiohydantoin, 2,4-dimercapto-6-amino-5-triazine, and mixtures thereof in a solution that is substantially free of zinc phosphate to bring an aqueous mixture of the metal salts to a pH of above 6 and below 8.

15. The method according to claim 14, wherein the step of providing the metal salt of a corrosion-inhibiting organic anion comprises:
  contacting a nitrate salt of the metal with an acid form of the corrosion inhibiting organic anion in a methanol/water mixture; and
  recovering the metal salt of a corrosion inhibiting organic anion as a precipitate.

16. The method according to claim 14, comprising the steps of:
  contacting $Zn(NO_3)_2$ with DMcT in a methanol/water mixture; and recovering $Zn(DMcT)_2$ as a precipitate; and
  contacting the $Zn(DMcT)_2$ with a basic material that is selected from the group consisting of $Na_2(DMcT)$, $K_2(DMcT)$, and mixtures thereof, in an amount sufficient to neutralize the $Zn(DMcT)_2$ salt to a point where a 2.5% by weight aqueous solution of the dried salt has a pH between about 6.5 and about 7.2.

17. A method of using a corrosion-responsive agent comprising a neutralized metal salt of a corrosion-inhibiting organic anion to reduce or prevent the corrosion of a metal that is subject to corrosion, wherein the agent is substantially free of zinc phosphate, the method comprising applying to a surface of the metal that is subject to corrosion a neutralized metal salt of the corrosion-inhibiting organic anion, wherein a 2.5% by weight aqueous mixture of the dried salt has a pH that is above 6 and below 8.

18. The method according to claim 17, wherein the metal that is subject to corrosion is a copper-containing aluminum alloy.

19. The method according to claim 17, wherein the method comprises:
  applying a conversion coating to the surface of the metal that is subject to corrosion, wherein the conversion coating is selected from a chromate conversion coating and a coating comprising poly [bis(2,5-(N,N,N',N'-tetralkyl)amine)-1,4-phenylene vinylene] (BAMPPV); and
  applying a coating comprising the neutralized metal salt of the corrosion-inhibiting organic anion over the conversion coating.

* * * * *

UNITED STATES PATENT AND TRADEMARK OFFICE
CERTIFICATE OF CORRECTION

| | | |
|---|---|---|
| PATENT NO. | : 7,935,181 B2 | Page 1 of 1 |
| APPLICATION NO. | : 12/074578 | |
| DATED | : May 3, 2011 | |
| INVENTOR(S) | : Scott Hayes and Patrick J. Kinlen | |

It is certified that error appears in the above-identified patent and that said Letters Patent is hereby corrected as shown below:

Replace the term "Fe(II or II)" with the term -- Fe(II or III) -- in Column 3, line 7.

Replace the term "dimethyldithio" with the term -- dimethyidithio -- in Column 3, line 30.

Replace the term "Ce(II or IV)," with the term -- Ce(III or IV), -- in Column 3, line 57.

Replace the term "many," with the term -- any -- in Column 5, line 36.

Replace the term "dimethyldithio" with the term -- dimethyidithio -- in Column 15, line 26.

Replace the term "dimethyldithio" with the term -- dimethyidithio -- in Column 16, line 39.

Signed and Sealed this
Twenty-first Day of June, 2011

David J. Kappos
*Director of the United States Patent and Trademark Office*